(12) United States Patent
Ghadge et al.

(10) Patent No.: US 11,570,666 B2
(45) Date of Patent: *Jan. 31, 2023

(54) PROVIDING LOW LATENCY TRAFFIC SEGREGATION FOR MOBILE EDGE COMPUTING NETWORK ENVIRONMENTS

(71) Applicant: Cisco Technology, Inc., San Jose, CA (US)

(72) Inventors: Amit Ghadge, Pune (IN); Nithin Chitta, Pune (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 16/991,139

(22) Filed: Aug. 12, 2020

(65) Prior Publication Data

US 2020/0374762 A1 Nov. 26, 2020

Related U.S. Application Data

(63) Continuation of application No. 16/255,030, filed on Jan. 23, 2019, now Pat. No. 10,798,617.

(51) Int. Cl.
*H04W 36/00* (2009.01)
*H04W 80/10* (2009.01)
(Continued)

(52) U.S. Cl.
CPC ......... *H04W 36/0022* (2013.01); *H04W 8/08* (2013.01); *H04W 28/0273* (2013.01); *H04W 36/32* (2013.01); *H04W 80/10* (2013.01)

(58) Field of Classification Search
CPC ............... H04W 36/0022; H04W 8/08; H04W 28/0273; H04W 36/32; H04W 80/10;
(Continued)

(56) References Cited

U.S. PATENT DOCUMENTS 8,743,696 B2 6/2014 Chowdhury
9,432,258 B2 8/2016 Van der Merwe et al.
(Continued)

OTHER PUBLICATIONS

"Exploitation of Mobile Edge Computing in 5G Distributed Mission-Critical Push-to-Talk Service Employment"; Solozabal et al.; IEEE Access vol. 6, 2018 (Year: 2018).*

(Continued)

*Primary Examiner* — Benjamin H Elliott, IV
(74) *Attorney, Agent, or Firm* — Edell, Shapiro & Finnan, LLC

(57) ABSTRACT

Techniques that provide low latency traffic segregation to ensure an edge user plane (UP) is not overloaded are described herein in at least one embodiment. In at least one embodiment, a method may include determining offload of low latency traffic of a user equipment (UE) at a mobile network edge, wherein the UE has non-low latency traffic associated with a first packet data network session for an access point name; notifying the UE to request creation of a second packet data network session for the access point name; selecting an edge UP element to handle the low latency traffic for the second packet data network session;

(Continued)

creating the second packet data network session at the selected edge UP element; and notifying the UE that second packet data network session is created.

20 Claims, 8 Drawing Sheets

(51) Int. Cl.
 *H04W 8/08* (2009.01)
 *H04W 28/02* (2009.01)
 *H04W 36/32* (2009.01)

(58) Field of Classification Search
 CPC .. H04W 28/085; H04W 48/18; H04L 47/125; H04L 47/28
 See application file for complete search history.

(56) References Cited

U.S. PATENT DOCUMENTS

| | | | |
|---|---|---|---|
| 9,788,201 | B2 | 10/2017 | Stojanovski et al. |
| 10,798,617 | B1* | 10/2020 | Ghadge ............... H04W 28/085 |
| 2011/0075557 | A1 | 3/2011 | Chowdhury et al. |
| 2014/0078986 | A1 | 3/2014 | Kaippallimalil et al. |
| 2014/0286311 | A1 | 9/2014 | Sayeedi et al. |
| 2015/0195835 | A1 | 7/2015 | Lin et al. |
| 2016/0135072 | A1 | 5/2016 | Wang et al. |
| 2016/0183149 | A1 | 6/2016 | Stojanovski et al. |
| 2017/0104839 | A1 | 4/2017 | Starsinic et al. |
| 2018/0041905 | A1 | 2/2018 | Ashrafi |
| 2018/0248787 | A1 | 8/2018 | Rajagopal et al. |
| 2018/0249317 | A1 | 8/2018 | Kurasugi et al. |
| 2018/0255463 | A1 | 9/2018 | Zheng et al. |
| 2018/0295659 | A1 | 10/2018 | Shan |
| 2018/0316606 | A1 | 11/2018 | Sung et al. |
| 2018/0352482 | A1 | 12/2018 | Gage et al. |
| 2018/0367322 | A1 | 12/2018 | Watanabe et al. |
| 2019/0037474 | A1 | 1/2019 | Xu et al. |
| 2019/0191343 | A1 | 6/2019 | Iwai et al. |
| 2019/0261213 | A1 | 8/2019 | Palnati et al. |
| 2019/0276324 | A1 | 9/2019 | Hoffmann |
| 2019/0313285 | A1 | 10/2019 | Gottwerth et al. |
| 2020/0076875 | A1 | 3/2020 | Sabella et al. |
| 2020/0170003 | A1* | 5/2020 | Kim ...................... H04W 76/12 |
| 2020/0374762 | A1* | 11/2020 | Ghadge ............... H04W 28/085 |

OTHER PUBLICATIONS

"Building Dynamic Mapping with CUPS for Next Generation Automotive Edge Computing"; Sun et al.; 2019 IEEE 8th International Conference on Cloud Networking (CloudNet) (Year: 2019).*
Sami Kekki et al., "MEC in 5G networks", ETSI White Paper No. 28, ISBN No. 979-10-92620-22-1, Jun. 2018, 28 pages.
3GPP Organizational Partners, "3rd Generation Partnership Project; Technical Specification Group Core Network and Terminals; Mobile radio interface Layer 3 specification; Core network protocols; Stage 3 (Release 15)", 3GPP TS 24.008 V15.4.0, Sep. 2018, 790 pages.
Amit Ghadge, "Cisco Ultra Packet Core Cups", Cisco, v1.3, 25 pages; retrieved from Internet May 5, 2020.
Yin Dongming, "Getting closer to you: MEC@CloudEdge", Huawei Publications, Feb. 17, 2017, 9 pages.
Sami Kekki et al., "MEC in 5G networks", ETSI White Paper No. 28, First edition, Jun. 2018, 28 pages.
AT&T Business, "Redefine your edge with a future-ready, intelligent mobile network architecture", AT&T Business, 2019, 2 pages.
Samsung, "5G Core Vision", Samsung 5G Core vol. 1, 2019, 16 pages.
Choi et al., "Support for Edge Computing in the 5G Network", Jun. 25, 2018, 5 pages.
Hadzic et al., "Server Placement and Selection for Edge Computing in the ePC", IEEE, vol. 12, No. 5 , Sep. 2019, 14 pages.
"3rd Generation Partnership Project; Technical Specification Group Services and System Aspects; Architecture enhancements for control and user plane separation of EPC nodes; Stage 2 (Release 15)," 3GPP TS 23.214 V15.5.0, Dec. 2018, 92 pages.
"3rd Generation Partnership Project; Technical Specification Group Services and System Aspects; General Packet Radio Service (GPRS) enhancements for Evolved Universal Terrestrial Radio Access Network (E-UTRAN) access Release 16)," 3GPP TS 23.401 V16.1.0, Dec. 2018, 411 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 15)," 3GPP TS 23.401 V15.6.0, Dec. 2018, 411 pages.
"3rd Generation Partnership Project; Technical Specification Group Services and System Aspects; System Architecture for the 5G System; Stage 2 (Release 15)," 3GPP TS 23.501 V15.4.0, Dec. 2018, 236 pages.

* cited by examiner

PROVIDING LOW LATENCY TRAFFIC SEGREGATION FOR MOBILE EDGE COMPUTING NETWORK ENVIRONMENTS

CROSS-REFERENCE TO RELATED APPLICATION

This application is a continuation of and claims the benefit of priority to U.S. patent application Ser. No. 16/255,030, filed on Jan. 23, 2019, and issued on Oct. 6, 2020 as U.S. Pat. No. 10,798,617, the entire contents of which are incorporated herein by reference.

TECHNICAL FIELD

The present disclosure relates to a communication system, in particular, to providing low latency traffic segregation for mobile edge computing network environments to ensure the edge user plane is not overloaded.

BACKGROUND

Mobile networking architectures have grown increasingly complex in communication environments. In some cases, mobile network architectures can be implemented using Software Defined Network (SDN) techniques in order to deploy Control and User Plane Separation (CUPS) architectures in which the data path and the control path for a mobile network are split across two planes, a user plane and a control plane. As the number of user equipment increases and as CUPS architectures become more prevalent for mobile networking deployments, efficient management of communication resources becomes more critical. Accordingly, there are significant challenges in facilitating CUPS architectures for a network environment.

DESCRIPTION OF EXAMPLE EMBODIMENTS

Overview

Figure 1:
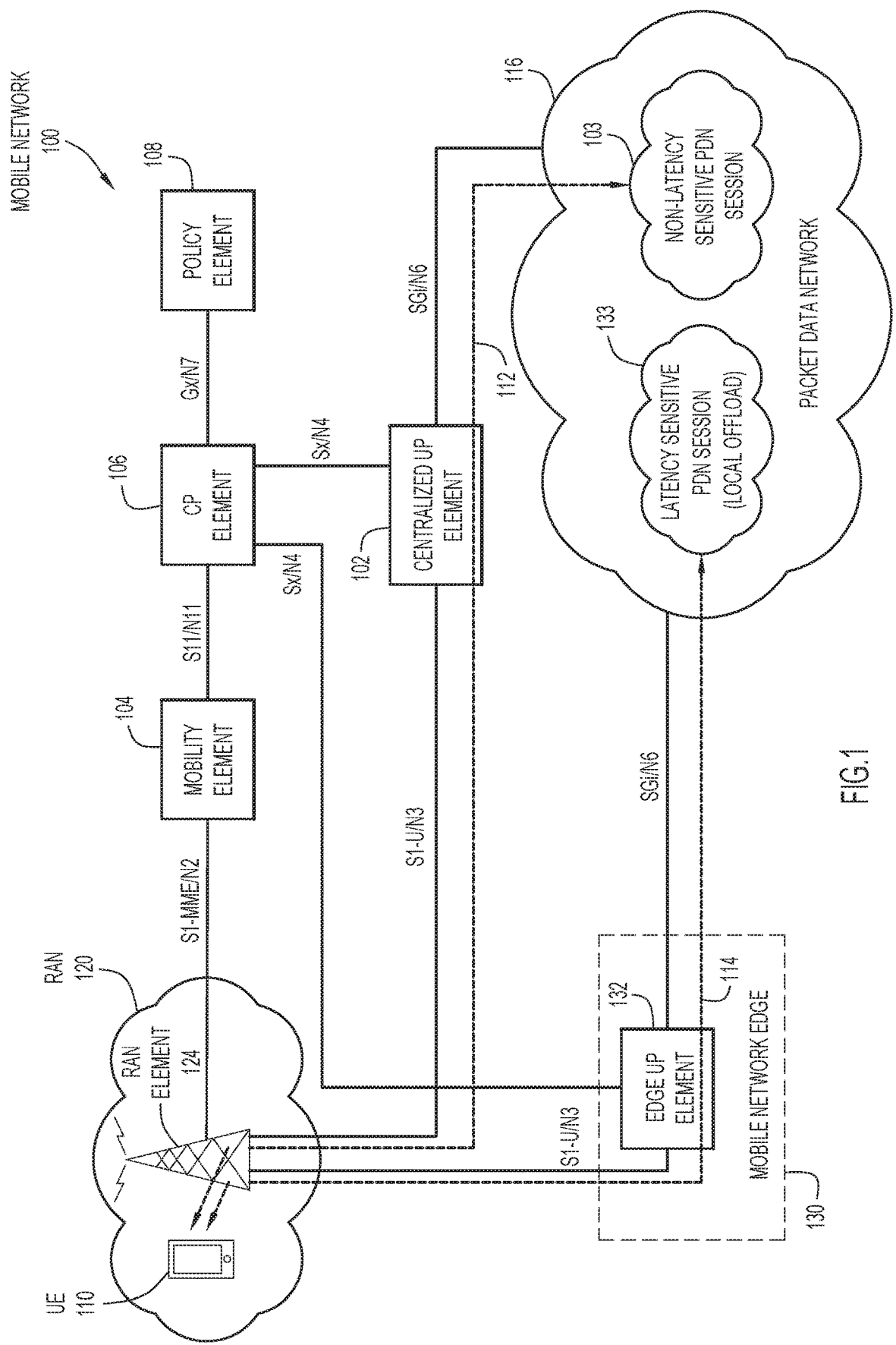
FIG. 1 is a simplified block diagram illustrating example details associated with a mobile network in which techniques that provide low latency traffic segregation to ensure the edge user plane is not overloaded may be implemented, according to an example embodiment.

Mobile Edge Computing (MEC) is enabled by Control and User Plane Separation (CUPS). CUPS enables mobile network operators to have user plane elements hosted (e.g., instantiated) at the edge of a mobile network, which is characterized as being geographically closer to the Radio Access Network (RAN), as opposed to centralized user plane elements for the mobile network that are often hosted at locations that are geographically farther away from the RAN. It is useful to offload latency sensitive traffic at the mobile network edge; however, compute resources at the edge are often costly and scarce. Thus, it is important to ensure that traffic being handled by the user plane at the mobile network edge is genuinely traffic that needs low latency support.

Provided herein are techniques to provide low latency traffic segregation in a MEC network environment. In at least one embodiment, a method is provided and may include determining offload of low latency traffic of a user equipment (UE) at a mobile network edge, wherein the UE has non-low latency traffic associated with a first (e.g., non-low latency) packet data network session for an access point name. The method may further include notifying the UE to request creation of a second (e.g., low latency) packet data network session for the access point name. The method may further include selecting, upon receiving a request from the UE to create the second packet data network session, an edge user plane element to handle the low latency traffic for the second packet data network session, wherein a centralized user plane element handles the non-low latency traffic for the first packet data network session. The method may further include creating the second packet data network session at the selected edge user plane element and notifying the UE that second packet data network session is created. The method may further include receiving a notification from the UE that the UE supports low latency traffic segregation and offload at the mobile network edge.

Example Embodiments

For purposes of understanding certain embodiments of systems and architectures disclosed herein, it is important to appreciate the technologies and data that may be associated with network communications for 3rd Generation Partnership Project (3GPP) Long Term Evolution (LTE) Evolved Packet Core (EPC) system architectures, sometimes referred to as 4th Generation (4G)/LTE architectures, as well as 3GPP 5th Generation (5G) architectures. The following foundational information may be viewed as a basis from which the present disclosure may be properly explained.

Architectures that facilitate network communications generally rely upon three basic components: a data or user plane, a control plane, and a management plane. Typically, the user plane carries data traffic (e.g., user data traffic), while the control plane and the management plane serve the data plane. As referred to herein and in the claims, the term 'plane' can refer to a separation of traffic that can traverse a network.

Compute node(s) having hardware and software resources that can be abstracted into one or more logical layers can also be used to facilitate building and deploying Software Defined Network (SDN) architectures for virtualized network environments. Generally, SDN architectures provide an approach to building and deploying computer networks, networking equipment and software that separates and abstracts the control plane and user plane of networking systems. SDN decouples the control plane that makes decisions about where traffic is sent from the underlying user plane that forwards traffic to a selected destination. SDN allows network administrators, operators, etc. to manage network services through abstraction of lower level functionality into a virtualized network environment. In various embodiments, a compute node can include, but not be limited to: a data center compute node such as a server, rack of servers, multiple racks of servers, etc. for a data center; a cloud compute node, which can be distributed across one or more data centers; among others.

As referred to herein in this disclosure, the terms 'virtual machine', 'virtualized network function' and 'virtualized network functionality' can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), a virtualized network function component (VNFC), virtualized functionality and/or any virtualized network controller, element, module, aggregator, combinations thereof or the like as described herein may execute (e.g., be instantiated to perform one or more operation(s)) via a hypervisor-based virtualization or a container-based virtualization of one or more compute node(s) using the compute node(s)' hardware (e.g., processor, memory, network interfaces, etc.), software and/or operating system for a given virtualized network environment.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or other generic data units that may be used to transmit communications (e.g., data and/or commands) in a network. A packet is a formatted unit of data that can contain control or routing information (e.g., source and destination address, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

Communications in a network environment can be sent and received according to any suitable communication protocols. Suitable communication protocols can include a multi-layered scheme such as the Open Systems Interconnection (OSI) Model, or any derivations or variants thereof. Within a network architecture or environment, Internet Protocol (IP) addresses for any element in the network environment can be assigned using Dynamic Host Configuration Protocol (DHCP), Stateless Address Auto-configuration (SLAAC), during default bearer activation processes, etc., or any suitable variation thereof. IP addresses discussed herein and in the claims can include IP version 4 (IPv4) and/or IP version 6 (IPv6) addresses.

In traditional 3GPP 4G architectures, user equipment (UE) devices typically connect to a service provider network through over-the-air communications with one or more radio nodes such as evolved Node Bs (eNodeBs or eNBs), which interface with control plane elements such as Mobility Management Entities (MMEs) and user plane elements such as serving Gateways (SGWs) and Packet Data Network (PDN) Gateways (PGWs). In some 4G architectures, S2a over General Packet Radio System (GPRS) Tunneling Protocol (GTP) Mobility Gateways (SaMOGs) may be used to facilitate non-3GPP accesses to 3GPP services. As referred to herein and in the claims, the terms 'UE device', 'UE', 'mobile station', 'subscriber', 'user', and variations thereof can be used interchangeably.

User plane elements such as SGWs can route and forward user data packets while also acting as a mobility anchor for inter-3GPP mobility (e.g., handling mobility interfacing to other networks such as 2nd Generation (2G) and/or 3rd Generation (3G) networks) and during inter-eNodeB handoffs or handovers. Further for traditional 3GPP 4G architectures, PGWs may provide UE connectivity to external Access Point Names (APNs), such as the Internet, an IP Multimedia Subsystem (IMS), combinations thereof, or the like. A PGW can serve as a policy enforcement point to manage Quality of Service (QoS), flow classification, online/offline flow-based charging, data generation, shallow packet inspection, deep packet inspection (DPI), packet filtration, intercept, combinations thereof or the like.

SDN concepts can be applied to a traditional 3GPP 4G architecture to enable separation of the control and user planes in order to implement a Control and User Plane Separation (CUPS) architecture in which the control and user paths are split across the two planes thereby creating a control plane (CP) implemented via one or more controller element(s) and a user plane (UP) implemented via one or more forwarding element(s) (FE(s)). For a 3GPP 4G CUPS architecture, the control plane element(s) can include any number of MMEs, control plane SGWs (referred to herein as SGW-Cs), and control plane PGWs (referred to herein as PGW-Cs) that manipulate the user plane network infrastructure to facilitate end-to-end service provider network connectivity. Also for a 3GPP 4G CUPS architecture, the user plane FE(s) can include any number of user plane SGWs (referred to herein as SGW-Us) and user plane PGWs (referred to herein as PGW-Us) that can process and perform operations on subscriber (e.g., UE) traffic as the traffic passes through the service provider network. In some embodiments, functionality for the SGWs and PGWs can be combined to provide a System Architecture Evolution Gateways (SAEGWs), which can be implemented in a CUPS architecture as control plane SAEGWs (referred to herein as SAEGW-Cs) and user plane SAEGWs (referred to herein as SAEGW-Us). Together, the control plane and user plane elements can manage the forwarding of all subscriber traffic through a service provider network. Generally in a 4G CUPS architecture, the MME selects an SGW-C to handle a UE session.

For a 3GPP 5G architecture, control plane elements can include, among other elements, an Access and Mobility Function (AMF) and a Session Management Function (SMF), and user plane elements can include User Plane Functions (UPFs), as defined in 3GPP standards. Generally, the AMF provides authentication, authorization, and mobility management for UEs. Generally, the SMF is responsible for session management with individual functions being supported on a per-session basis in which the SMF allocates IP addresses to UEs, and selects and controls the UPFs for data transfer. In some cases, an SMF can manage and control hundreds of UPFs. The SMF also acts as the external point for all communication related to the various services offered and enabled in the user plane and how the policy and charging treatment for these services is applied and controlled. Other control plane elements may be implemented, as defined in 3GPP standards. In general the AMF/SMF may provide functionality similar to that of MMES in 4G architectures. The UPFs may operate as VNFs to serve as forwarding engines for user traffic and may perform a variety of functions such as shallow packet inspection, DPI, traffic optimization and inline services such as Network Address Translation (NAT)/Firewall/Domain Name System (DNS) snooping, etc. In addition, UPFs may also provide some services analogous to PGW-Us in 4G CUPS architectures.

As noted previously, Mobile Edge Computing (MEC) is enabled by CUPS, which allows mobile network operators to have user plane elements hosted (e.g., instantiated) at the edge of a mobile network. MEC provides for the ability to offload latency sensitive traffic at the edge of a mobile network.

There are many cases in which it may useful to offload latency sensitive traffic at the mobile network edge. In some cases, for example, it may be useful to offload latency sensitive traffic at the mobile network edge in order to meet 3GPP Ultra-Reliable and Low Latency Communication (URLLC) requirements. In other cases, such as within an APN, say the Internet APN, a network operator may want to segregate and offload low latency traffic based on application type within that APN, or perhaps based on a partnership with a content provider (e.g., Netflix, Hulu, Amazon) to provide a better customer experience.

While it may be useful to offload low latency traffic at the network edge, compute resources at the edge are often costly and scarce. Thus, it is important to ensure that traffic being handled by the user plane at the edge is genuinely traffic that needs low latency support.

Currently, MEC is achieved in the following ways:

Option 1: One option is to have separate APNs for low latency traffic and non-latency traffic. With one APN PDN hosted on the UP at the edge and the other one at the centralized UP. For this option, however, there is a need to have two different APNs and, thus, two PDNs. This option doesn't help when the low latency traffic and the non-latency sensitive traffic belong to the same APN.

Option 2: Another option is to have one APN for both types of traffic and have the whole traffic for a subscriber be handled by the SGW/SAMOG user plane at the edge and offload some flows at the edge, while the rest of the traffic is carried to the centralized UP of the centralized PGW. However, this option can lead to having the UP at the edge processing lots of traffic and, thus, needing lots of resources and becoming costly.

Example embodiments described herein provide techniques to overcome these hurdles in order to provide for the ability to segregate traffic for a same APN and ensure that only the low latency sensitive traffic is handled by the UP at the edge, which ensures that the edge UP is not overloaded. Techniques proposed by example embodiments described herein may provide a network operator the ability to segregate traffic within a PDN connection such that low latency traffic is segregated from the rest of the non-latency sensitive traffic. Thus, only genuine low latency traffic is processed on the edge user plane, whereas the rest of the non-latency sensitive traffic is routed to the centralized user plane.

In at least one embodiment, techniques described herein may be applied on top of 3GPP defined standards and may include extending 3GPP protocols to carry additional information that may facilitate the ability to provide a flexible and dynamic solution that lessens impacts on 3GPP network functions. For example, embodiments described herein may include extending control plane GTP (referred to herein as GTP-C) signaling and Gx/N7 interface signaling with attribute-value pair (AVP) private extensions and/or information element (IE) private extensions to carry additional information that facilitates low latency traffic segregation at the mobile network edge. Further, techniques described herein may provide a network operator with the ability to control the enablement of low latency traffic segregation features rather than allowing them to be UE driven.

In accordance with embodiments described herein, techniques for providing low latency traffic segregation at the mobile network edge may impact various network elements and/or nodes including: UE, various CP elements (e.g., PGW-C, SAEGW-C, and/or SMF), and policy elements (e.g., Policy and Charging Rules Function (PCRF) and/or Policy Control Function (PCF)).

Referring to FIG. 1, FIG. 1 is a simplified block diagram illustrating example details associated with a mobile network 100 in which techniques that provide for low latency traffic segregation to ensure the edge user plane is not overloaded may be implemented, according to an example embodiment. In at least one embodiment, mobile network 100 may include a Radio Access Network (RAN) 120, an edge user plane (UP) element 132, a centralized UP element 102, a mobility element 104, a control plane (CP) element 106, a policy element 108, and at least one user equipment (UE) 110. RAN 120 may include a RAN element 124 that enables over-the-air Radio Frequency (RF) communications (e.g., 4G and/or 5G) with UE 110. Also shown in FIG. 1 is a packet data network (PDN) 116.

Edge UP element 132 may be hosted (e.g., instantiated) via mobile network 100 resources (e.g., compute nodes) that may be deployed at an edge 130 of mobile network 100. Note, edge 130 may be referred to herein interchangeably using the terms 'edge 130' or 'mobile network edge 130'.

A latency sensitive PDN session 133 may facilitate local offload of low latency traffic (illustrated in FIG. 1 as dashed-line 114) for UE 110 while a non-latency sensitive PDN session 103 may be used for non-low latency traffic (illustrated in FIG. 1 as dashed line 112) for UE 110, as discussed for embodiments herein.

In general, elements hosted (e.g., instantiated) at an edge of a mobile network may be characterized as being hosted by network resources (e.g., compute nodes) that are deployed at geographic location(s) that are closer to RAN elements of the mobile network and/or, in some embodiments, are integrated within or co-located with RAN elements in order to provide a low latency interconnection between the RAN elements and a latency sensitive or low latency PDN session for one or more APNs of a PDN. In contrast, centralized elements may be characterized as elements that are hosted by network resources that are deployed at geographic location(s) that may be farther from the RAN elements (relative to the edge elements) and may provide a non-latency sensitive interconnection between the RAN elements and a non-latency sensitive PDN session for one or more APNs of a PDN. The centralized elements add latency to traffic; thereby, impacting subscriber experience.

As described herein and in the claims, the terms 'low latency traffic' and 'latency sensitive traffic' can be used interchangeably to refer to traffic that has heightened timing constraints or requirements (e.g., due to Service Level Agreements (SLAs), URLLC, etc.) than non-latency sensitive traffic. Various constraints and/or requirements that may be associated with low latency traffic may include, not be limited to: transmission and/or processing time requirements within a network (e.g., between originating and terminating points of traffic within the network), reliability requirements (e.g., packet error rates, drop rates, etc.), combinations thereof, or the like.

In at least one embodiment, one or more elements of FIG. 1 (e.g., centralized UP element 102, edge UP element 132, mobility element 104, CP element 106, policy element 108, etc.) may be implemented (e.g., hosted, instantiated, etc.) for any combination of 3GPP 4G CUPS and/or 3GPP 5G implementations via one or more compute node(s) having hardware and software resources, which can be abstracted into one or more instances of such elements. In various embodiments, a compute node can include, but not be limited to: a data center compute node such as a server, rack of servers, multiple racks of servers, etc. for a data center; a cloud compute node, which can be distributed across one or more data centers; combinations thereof; or the like.

It is to be understood that mobile network 100 may include any number of UE 110, RAN elements 124, centralized UP elements 102, edge UP elements 132, mobility elements 104, CP elements 106, and/or policy elements 108 depending on applications and/or implementations. In various embodiments, any other control and/or user plane elements may be present for mobile network 100, as may be defined by 3GPP standards. Further, it is to be understood that various messages, signaling, exchanges, etc. as discussed for various embodiments described herein (e.g., Create PDN Request, Create Session Request/Response, Sx Session Create/Response, CCR-I, CCA-I, RAR, RAA, Update Bearer Request/Response, etc.) may be implemented as defined by 3GPP standards and, in some embodiments, may be extended to carry additional information (e.g., private extensions, etc.) using techniques that conform with 3GPP standards.

In various embodiments, centralized UP element 102 and edge UP element 132 may be implemented as any combination of a SGW-U/PGW-U or a SAEGW-U for a 4G CUPS implementation for mobile network 100, a UPF for a 5G implementation for mobile network 100, and/or any combination thereof for any mixed 4G/5G CUPS implementations. In various embodiments, mobility element 104 may be implemented as a MME for a 4G CUPS implementation for mobile network 100, an AMF for a 5G implementation for mobile network 100, and/or any combination thereof for any mixed 4G/5G CUPS implementations. In various embodiments, CP element 106 may implemented as any combination of a SGW-C/PGW-C or a SAEGW-C for a 4G CUPS implementation for mobile network 100, an SMF for a 5G implementation for mobile network 100, and/or any combination thereof for any mixed 4G/5G CUPS implementations. In various embodiments, policy element 108 may be implemented as any combination of a PCRF for a 4G CUPS implementation for mobile network 100, a PCF for a 5G implementation for mobile network 100, and/or any combination thereof for any mixed 4G/5G implementation. In various embodiments, RAN element 124 may be an evolved Node B (eNodeB) (e.g., for a 4G implementation), a gNodeB (e.g., for a 5G implementation), or a combination thereof.

As referred to herein in this disclosure and in the claims, the terms 'edge UP element' and 'edge UP' may be used interchangeably and the terms 'centralized UP element' and 'centralized UP' may be used interchangeably.

In various embodiments, UE 110 of mobile network 100 may be associated with any user, subscriber, employee, client, customer, electronic device, etc. wishing to initiate a flow in mobile network 100. The terms 'UE device', 'UE', 'subscriber', 'user', and 'mobile device' are inclusive of devices used to initiate a communication, such as a computer, an electronic device such as a parking meter, vending machine, appliance, Internet of Things (IoT) device, etc., a personal digital assistant (PDA), a laptop or electronic notebook, a cellular telephone, an iPhone™, iPad™, a Google Droid™ phone, an IP phone, wearable electronic device or any other device, component, element, or object capable of initiating voice, audio, video, media, or data exchanges within mobile network 100. UE as discussed herein may also be inclusive of a suitable interface to a human user such as a microphone, a display, a keyboard, or other terminal equipment. Further, UE as discussed herein may also be any device that seeks to initiate a communication on behalf of another entity or element such as a program, a database, or any other component, device, element, or object capable of initiating an exchange within mobile network 100. In some embodiments, UE as discussed herein may have a bundled subscription for network access and application services, etc.

For the embodiment of FIG. 1, RAN element 124 may interface with mobility element 104 via any combination of a 3GPP S1-MME interface (for 4G CUPS implementations) and/or a 3GPP N2 interface (for 5G implementations), which is referred to herein as an S1-MME/N2 interface. Mobility element 104 may further interface with CP element 106 via any combination of a 3GPP S11 interface (for 4G CUPS implementations) and/or a 3GPP N11 interface (for 5G implementations), which is referred to herein as an S11/N11 interface. CP element 106 may further interface with policy element 108 via any combination of a 3GPP Gx interface (for 4G CUPS implementations) and/or a 3GPP N7 interface (for 5G implementations), which is referred to herein as a Gx/N7 interface.

RAN element 124 may further interface with centralized UP element 102 via any combination of a 3GPP S1-U interface (for 4G CUPS implementations) and/or a 3GPP N3 interface (for 5G implementations), which is referred to herein as an S1-U/N3 interface. RAN element 124 may further interface with edge UP element 132 via an S1-U/N3 interface.

Centralized UP element 102 may further interface with CP element 106 via any combination of a 3GPP Sx interface (for 4G CUPS implementations) and/or a 3GPP N4 interface (for 5G implementations), which is referred to herein as an Sx/N4 interface, and may further interface with PDN 116 for non-latency sensitive PDN session 103 via any combination of a 3GPP SGi interface (for 4G CUPS implementations) and/or a 3GPP N6 interface (for 5G implementations), which is referred to herein as an SGi/N6 interface. Edge IP element 132 may further interface with CP element 106 via an Sx/N4 interface and may further interface with PDN 116 for latency sensitive PDN session 133 via a SGi/N6 interface. 3GPP interfaces may sometimes be referred to as reference points.

In at least one embodiment, techniques implemented via mobile network 100 may provide for setting up two PDN sessions for UE 110 to the same APN (e.g., the Internet) with one PDN session (e.g., latency sensitive PDN session 133) carrying low latency traffic 114 (also referred to herein as 'latency sensitive traffic') and the other PDN session (e.g., non-latency sensitive PDN session 103) carrying non-latency sensitive traffic 112. For example, during operation in at least one embodiment, CP element 106 selects edge UP element 132 closer to the edge 130 of mobile network 100 to ensure that UE 110 low latency traffic 114 is routed between UE 110 and PDN 116 for latency sensitive PDN session 133 via edge UP element 132. CP element 106 selects centralized UP element 102 to route UE 110 non-latency sensitive traffic 112 between UE 110 and PDN 116 for non-latency sensitive PDN session 103, which helps to ensure that the edge UP is not overloaded.

CP element 106 notifies policy element 108 which PDN session is for low latency traffic 114 and which PDN session is for non-latency sensitive traffic 112 so that policy element 108 can activate Policy and Charging Control (PCC) rules pertaining to the low latency traffic 114 and can activate the rest of the PCC rules pertaining to the non-latency sensitive traffic 112. The PCC rules help to ensure that appropriate traffic is handled on their respective type of PDN.

In addition, UE 110 is configured to support the ability to support two PDN sessions to the same APN for a PDN with one of the PDN sessions designated as the low latency PDN session (e.g., latency sensitive PDN session 133). During operation, CP element 106 communicates the low latency PDN session designation to UE 110 using a Protocol Configuration Options (PCO) information element (IE) private extension so that low latency/latency sensitive applications running on UE 110 may use low latency PDN session 133 for network communications.

Figure 2:
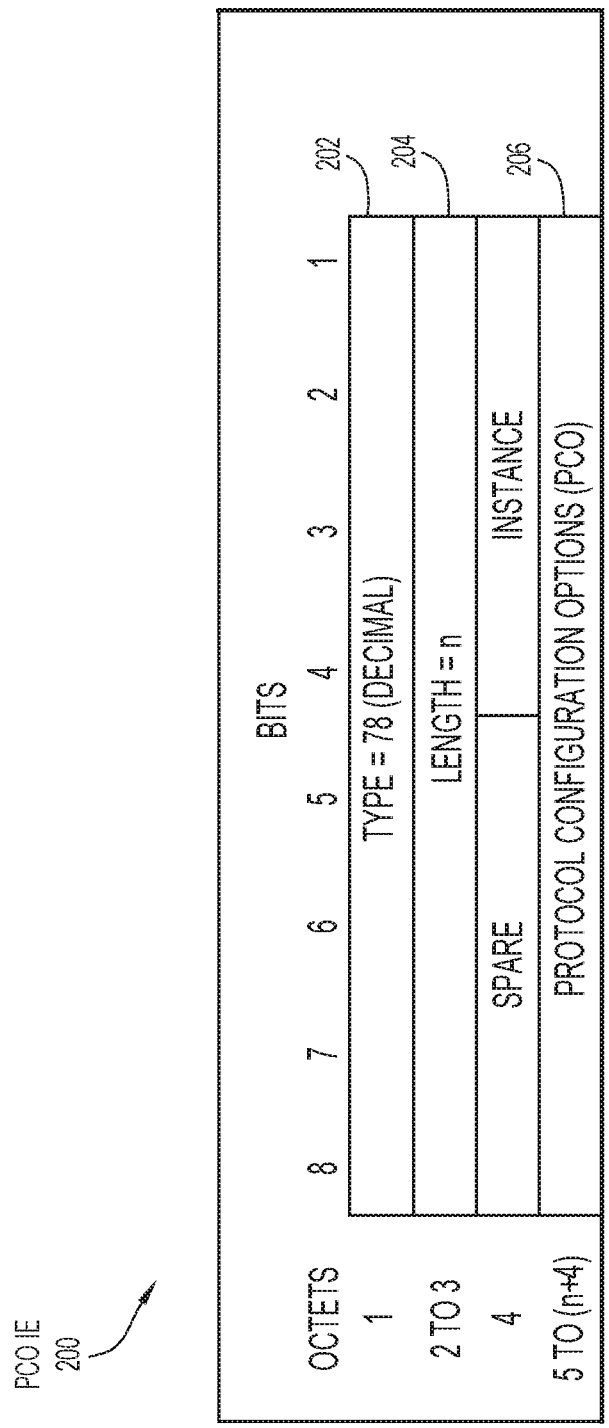
FIG. 2 is a simplified diagram illustrating example details associated with an example Protocol Configuration Options (PCO) Information Element (IE) that may be used to communicate information to facilitate low latency traffic segregation techniques, according to an example embodiment.

Referring to FIG. 2, FIG. 2 is a simplified diagram illustrating details associated with an example PCO IE 200 that may be used to communicate information to facilitate low latency traffic segregation techniques, according to an example embodiment.

As defined in 3GPP Technical Specification (TS) 24.008, PCO IE 200 includes various fields including, but not limited to, a Type field 202, a Length field 204, and a Protocol Configuration Options (PCO) field 206. Type field 202 is set to a decimal value 78, indicating a PCO type IE. Length field 204 is set to a value 'n' based on the length of PCO IE 200.

New container private extension identifiers may be configured to be carried in PCO field 206 for various communications within mobile network 100 to facilitate low latency traffic segregation techniques provided by embodiments described herein. For example, in at least one embodiment, private extension identifiers that are to be used in mobile station (MS) to network direction communications may be configured, such as a hexadecimal (H) identifier {0017H} [MS Supports Create Low Latency PDN Session] that UE 110 can include in messaging sent to mobile network 100 (e.g., sent to CP element 106) to indicate that UE 110 supports low latency traffic segregation to a low latency PDN session and offload at mobile network edge 130. Another MS to network direction private extension identifier may be configured, such as an identifier {0018H} [MS Indication of Create PDN for Low Latency PDN Session] that UE 110 can include in messaging sent to mobile network 100 (e.g., sent to CP element 106) to indicate a request to create a PDN session for a low latency PDN session.

Other private extension identifiers that are to be used in network to MS direction communications may be configured, such as an identifier {0017H} [Instruct UE to Create Low Latency PDN Session], which mobile network 100 (e.g., CP element 106) can use to instruct UE 110 to initiate a PDN session creation for a low latency PDN session. Another network to MS direction private extension identifier may be configured, such as an identifier {0018H} [Instruct UE of PDN being a Low Latency PDN Session], which mobile network (e.g., CP element 106) can use to instruct/inform UE 110 of a particular PDN session being a low latency PDN session.

The PCO field 206 can also be enhanced to carry a request identifier (ID). In at least one embodiment, a request ID may be a unique value that the network (e.g., CP element 106) generates and sends with a private extension trigger to the UE, which the UE is to include with its subsequent request to create the low latency PDN session. In some instances, it may be possible that there could be parallel triggers that could be in progress for multiple APNs for the same UE say for example, APN1 and APN2. In some instances, it may also be possible for a UE to trigger multiple PDN sessions for a same APN without a network trigger. Thus, the request ID may be used to ensure that a create PDN session request received from a UE is in response to a trigger initiated by the network for a particular APN or if it is due to the UE initiating a session creation on its own.

It is to be understood that the values of identifiers discussed herein that may be used in a PCO IE are provided for example only, and are not meant to limit the broad scope of the present disclosure. Virtually any values may be configured for a PCO IE to communicate similar information between a mobile network and one or more UEs, and, thus, are clearly within the scope of the present disclosure.

Figure 3:
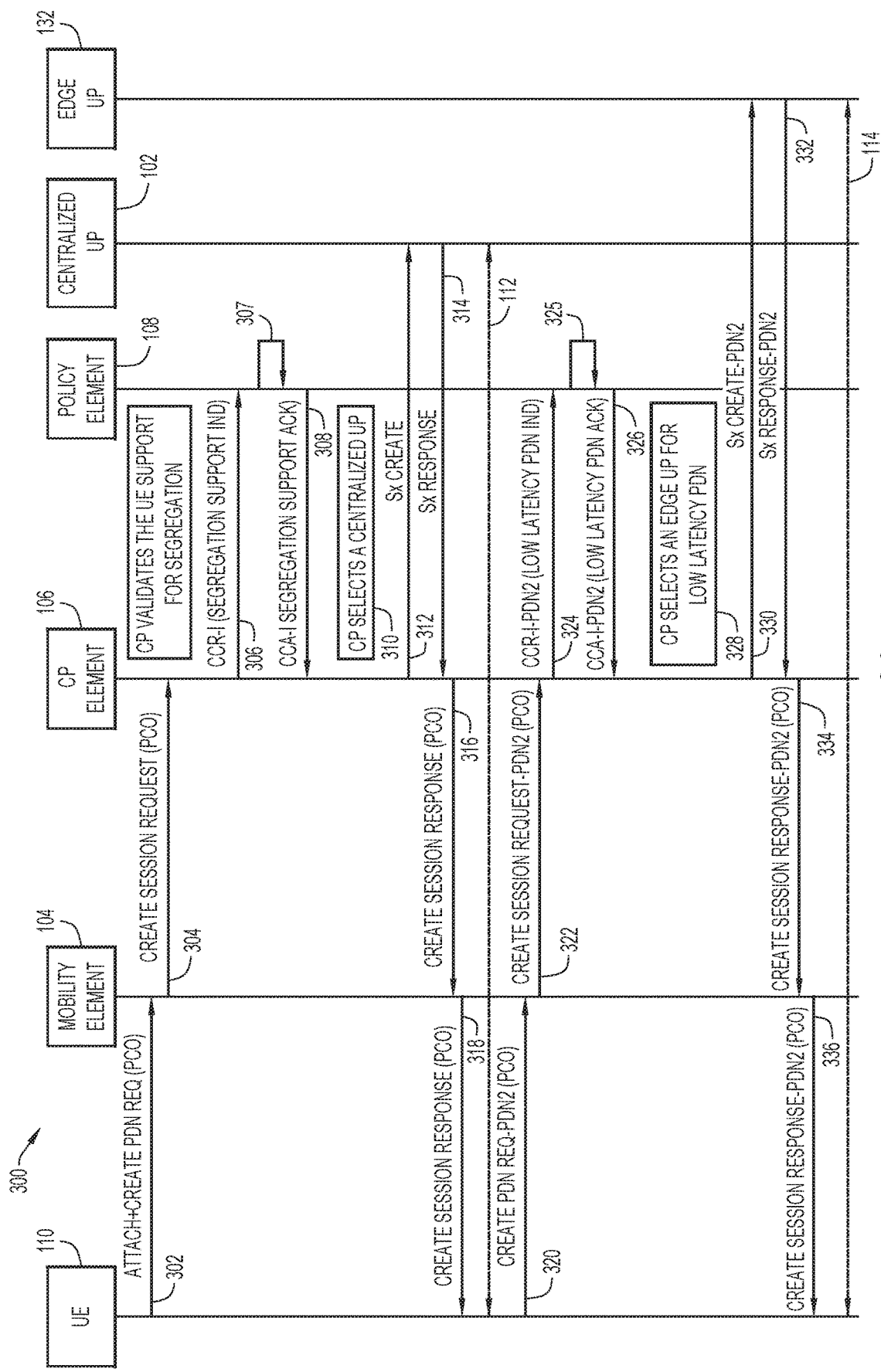
FIG. 3 is a simplified sequence diagram illustrating example interactions and operations associated with providing low latency traffic segregation to ensure the edge user plane is not overloaded, according to an example embodiment.

Referring to FIG. 3, FIG. 3 is a simplified sequence diagram illustrating example interactions and operations 300 associated with providing low latency traffic segregation to ensure the edge user-plane is not overloaded, according to an example embodiment. FIG. 3 includes UE 110, mobility element 104, CP element 106, policy element 108, centralized UP 102, and edge UP 132. For the embodiment of FIG. 3, consider that UE 110 and elements (e.g., CP element 106) are provisioned with the PCO IE private extension identifiers, as discussed in FIG. 2, to facilitate low latency traffic segregation.

At 302, UE 110 attaches (via over-the-air RF communications) to RAN element 124 and communicates a Create PDN Request message to mobility element 104 to initiate a PDN session creation to an APN say, the Internet, in which the Create PDN Request message includes, among other information, PCO IE 200 carrying private extension indication {0017H} [MS Supports Create Low Latency PDN Session, as discussed in FIG. 2]. Receipt of the message triggers mobility element 104 to communicate, at 304, a Create Session Request message including, among other information, the PCO IE carrying the private extension indication {0017H} to notify CP element 106 (e.g., the packet core) that UE 110 supports the low latency segregation feature.

Based on the receiving private extension indication in the Create Session Request message, CP element 106 determines (e.g., validates), based on an exchange with policy element 108, whether or not traffic segregation for UE can be performed. For example, at 306, CP element 106 communicates a Credit Control Request initial (CCR-I) message to policy element 108 via the Gx/N7 interface to notify policy element 108 that UE 110 supports low latency traffic segregation.

In at least one embodiment, CP element 106 may notify policy element 108 about UE 110 support for low latency traffic segregation using a private extension attribute-value pair (AVP) included in the CCR-I message that includes a UE low latency segregation support indication (IND). In at least one embodiment, the private extension AVP for indicating low latency traffic segregation support included in a CCR-I provided by CP element 106 may be a 'UE-Segregation-Support' AVP, which may be formatted as follows:

| | |
|---|---|
| UE-Segregation-Support::= | <AVP-Header: 9001> |
| | {AVP-Code} |
| | {AVP-Length} |
| | {AVP-Vendor-ID} |
| | [UE-Segregation-Support: IND/ACK] |
| | *[AVP] |

At 307, policy element 108 authenticates the request, based on mobile network 100 operator policy and/or subscription information for UE 110, to provide traffic segregation for UE 110. Based on a successful authentication for UE 110 traffic segregation, policy element 108 notifies CP element 106, at 308, via a Credit Control Answer initial (CCA-I) message, using the private extension AVP, UE-Segregation-Support AVP, that includes an acknowledgment (ACK) that low latency traffic segregation may be provided for UE 110. Policy element 108 may also activate all PCC rules for the UE for the non-latency sensitive PDN via the CCA-I message. Later, as discussed below, once a low latency PDN session is setup for the UE, the policy element will ensure that it then moves the PCC rules specific to low latency traffic for the UE to the low latency PDN session.

CP element 106 determines that it is to trigger a low latency PDN session setup for UE 110 based receiving authorization from policy element 108 for creation of the low latency PDN session. As discussed herein, both CP element 106 and policy element 108 take into account several factors when determining whether to create a low latency PDN session for a given UE including, whether the UE supports such a feature (e.g., as indicated by the UE via the private extension indication), whether the CP element supports low latency segregation (e.g., by the CP element recognizing and triggering the CCR-I to the policy element based on receiving an indication of UE support for segregation), whether the policy element supports low latency segregation (e.g., by the policy element recognizing and triggering creation of a low latency PDN session based on the private extension indication included in the CCR-I), whether the user/UE subscription allows for such segregation (e.g., based on receiving an ACK in the CCA-I), and/or network policy support for traffic segregation.

At 310, CP element 106 selects centralized UP 102 to handle non-latency sensitive traffic (e.g., non-latency sensitive traffic 112) for UE 110. At 312/314, CP element 106 initiates a session creation request/response exchange with centralized UP 102 via the Sx/N4 interface to create a session (e.g., non-latency sensitive PDN session 103) for UE 110 via centralized UP 102 for non-latency sensitive traffic 112 for UE 110. The non-latency sensitive PCC rules for the UE 110 session are activated for centralized UP 102 through the session creation process.

At 316/318, CP element 106 notifies UE 110 (via mobility element 104) to setup a low latency PDN session (e.g., latency sensitive PDN session 133) to the same APN by communicating a Create Session Response message to UE 110 that includes PCO IE 200 carrying the private extension indication {0017H} [Instruct UE to Create Low Latency PDN session, as discussed in FIG. 2] and a request ID, which indicates that UE 110 is to trigger the second (latency sensitive) PDN session creation using the request ID.

Upon receiving the Create Session Response message, non-latency sensitive traffic 112 transferred between UE 110 and PDN 116 for non-latency sensitive PDN session 103 can be handled via centralized UP 102. UE 110 is assigned, via mobile network 100, a first IP address for use with non-latency sensitive PDN session 103 communications.

Further based on receiving private extension indication {0017H} in the Create Session Response message, UE 110 initiates a second (latency sensitive) PDN session creation to the same APN, the Internet in this example. At 320, UE 110 communicates a Create PDN Request message to mobility element 104 to request creation of a second PDN session (PDN2) for the UE in which the message includes, among other information, PCO IE 200 carrying private extension indication {0018H} [MS Indication of Create PDN for Low Latency PDN Session, as discussed in FIG. 2] to notify CP element 106 that the request is for PDN session creation for a low latency PDN session (e.g., latency sensitive PDN session 133) and the request ID that was sent to the UE at 318. At 322, mobility element 104 communicates a Create Session Request message to CP element 106 that includes the PCO IE and the request ID.

At 324, CP element 106 notifies policy element 108 using another private extension AVP in a CCR-I message that includes an indication (IND) that the request is for a low latency PDN session so that policy element 108 may activate low latency traffic specific PCC rules for the low latency PDN session.

In at least one embodiment, the private extension AVP for indicating a request for a low latency PDN session that is included in a CCR-I provided by CP element 106 may be a private extension 'Create-Low-Latency-PDN' AVP, which may be formatted as follows:

| | |
|---|---|
| Create-Low-Latency-PDN::= | <AVP-Header: 9003> |
| | {AVP-Code} |
| | {AVP-Length} |
| | {AVP-Vendor-ID} |
| | [Create-Low-Latency-PDN: IND/ACK] |
| | *[AVP] |

At 325, policy element 108 determines low latency specific PCC rules to activate for the low latency PDN session for UE 110. Based on the determination, policy element 108 sends an ACK, at 326, using the private extension Create-Low-Latency-PDN AVP included in a CCA-I sent to CP element 106 acknowledging the low latency PDN session request and activating corresponding PCC rules (e.g., low latency specific/latency sensitive PCC rules) for the second low latency PDN session 133 for UE 110. In various embodiments, an indication (IND) or acknowledgment included in a private extension AVP may be any flag, bit, bit string, combinations thereof, or the like that may be used to signal an indication or acknowledgment among one or more network elements.

Based on the acknowledgement received from policy element 108, CP element 106, at 328, selects an edge UP element, such as edge UP element 132, closer to mobile network edge 130 to anchor the second PDN session for local offload of low latency traffic 114 for UE 110. In at least one embodiment, the selection of a UP element closer to a network edge, may be selected based on a User Location Information (ULI) IE associated with a UE that is typically included in network communications such as, for example, tracking area updates (TAUs) communicated to mobility element 104 during handovers as a UE moves throughout a mobile network. Location information included in a ULI may include any combination of location information including, but not limited to: Tracking Area Identifier (TAI), Routing Area Identifier (RAI), E-UTRAN Cell Global Identification (ECGI), Service Area Identifier (SAI), Cell Global Identification (CGI), and/or any other location information that may be included in a 3GPP ULI IE, which CP element 106 may use to correlate a UE location to the location of an edge UP element to handle traffic for a low latency PDN session.

At 330/332, CP element 106 initiates a session creation request/response exchange with selected edge UP 132 via the Sx/N4 interface to create a session for UE 110 via edge UP 132 for latency sensitive traffic (e.g., low latency traffic 114) that is to be handled by edge UP 132 for latency sensitive PDN session 133. The latency sensitive PCC rules for the UE 110 session are activated for edge UP 132 through the session creation process.

At 334/336, CP element 106 communicates a Create Session Response message to UE 110 (via mobility element 104) that includes PCO IE 200 carrying the private extension indication {0018H} [Instruct UE of PDN being a Low Latency PDN Session, as discussed in FIG. 2] that indicates that this PDN session is created and is associated with latency sensitive PDN session 133. UE 110 is assigned, via mobile network 100, a second IP address for use with latency sensitive PDN session 133 communications. In at least one embodiment, the Create Session Response message sent at 334/336 may also carry one or more Traffic Packet Filters pertaining to the low latency traffic 114 so that UE 110 can send the traffic on the appropriate PDN session (e.g., latency sensitive PDN session 133). In at least one embodiment, Traffic Packet Filter information may be carried in a Traffic Flow Template (TFT) IE, as prescribed by 3GPP TS 29.274 and TS 24.008. In various embodiments, a Traffic Packet Filter can include various information that a UE may use to identify packets belonging to a flow such as 5-tuple information (e.g., source IP address/port, destination IP address/port, ranges of such information, whether application of a filter applies to uplink or downlink transmissions, combination thereof, or the like as may be defined by 3GPP TS 29.274 and TS 24.008) in order for the UE to transmit packets via an appropriate PDN session. Upon receiving the Create Session Response message, latency sensitive traffic (e.g., low latency traffic 114) transferred between UE 110 and PDN 116 for latency sensitive PDN session 133 can be handled via edge UP 132.

Thus, as illustrated in the embodiment of FIG. 3, techniques that provide for low latency traffic segregation to ensure the edge user plane is not overloaded may be implemented via mobile network 100 in accordance with at least one embodiment.

Figure 4:
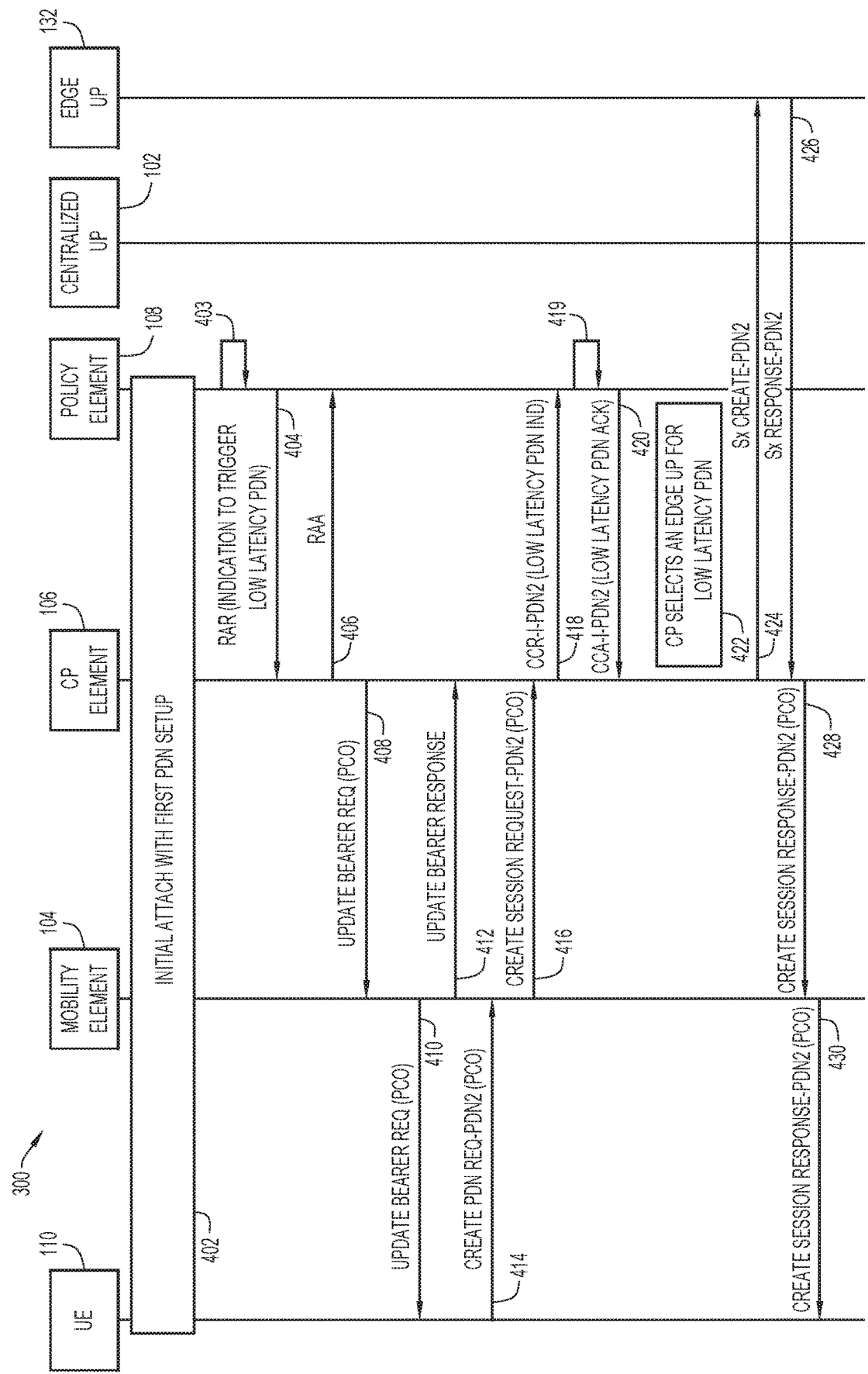
FIG. 4 is a simplified sequence diagram illustrating example other interactions and operations associated with providing low latency traffic segregation to ensure the edge user plane is not overloaded, according to an example embodiment.

In some embodiments, techniques that provide for low latency traffic segregation may include triggering low latency PDN session creation after a non-latency sensitive PDN session is already established for a UE. Referring to FIG. 4, FIG. 4 is a simplified sequence diagram illustrating other example interactions and operations 400 associated with providing low latency traffic segregation to ensure the edge user-plane is not overloaded, according to an example embodiment. In particular, the embodiment of FIG. 4 illustrates features associated with triggering low latency traffic segregation and offload at some time during a first, non-latency sensitive PDN session (e.g., non-latency sensitive PDN session 103) for a UE (e.g., UE 110) using a session update procedure. FIG. 4 includes UE 110, mobility element 104, CP element 106, policy element 108, centralized UP 102, and edge UP 132. For the embodiment of FIG. 4, consider that UE 110 and elements (e.g., CP element 106) are provisioned with the PCO IE private extension identifiers, as discussed herein.

At 402, consider that UE 110 attaches and creates a first PDN session, non-latency sensitive PDN session 103, in which non-latency sensitive traffic 112 (not shown in FIG. 4) between UE 110 and PDN 116 for non-latency sensitive PDN session 103 for a particular APN say, the Internet APN, is handled by centralized UP 102. As part of this session creation, consider that mobile network 100 (e.g., CP element 106) creates non-latency PDN session 103 without notifying UE 110 that it can initiate a second PDN session for low latency traffic.

In some instances, say, if a subscription changes for a subscriber associated with UE 110 or mobile network 100 detects traffic that needs low latency treatment, then mobile network 100 can trigger UE 110 to initiate sending a create session request for a low latency PDN session creation. For example, say policy element 108 detects, at 403, a subscription change for the subscriber associate with UE 110 in which the subscription change indicates that UE 110 supports low latency traffic segregation. Based on detecting the subscription change, policy element 108 initiates, at 404, a 3GPP Re-Auth-Request (RAR) message towards CP element 106 indicating the need to trigger a PDN session creation for UE 110 for low latency traffic. In some embodiments, the triggering indication can be carried in a private extension 'Trigger-Low-Latency-PDN' AVP, which may be formatted as follows:

```
Trigger-Low-Latency-PDN::=  <AVP-Header: 9005>
                            {AVP-Code}
                            {AVP-Length}
                            {AVP-Vendor-ID}
                            [Trigger-Low-Latency-PDN: IND/ACK]
                            *[AVP]
```

At 406, CP element 106 acknowledges the RAR by sending a 3GPP Re-Auth-Answer (RAA) message back to policy element 108. The RAA message may include an ACK carried in the Trigger-Low-Latency-PDN AVP. At 408, CP element 106 then initiates an Update Bearer Request procedure towards mobility element 104 that includes PCO IE 200 carrying the indication to create a PDN session for low latency traffic (e.g., {0017H}) and a request ID. At 410, mobility element 104 forwards the Update Bearer Request to convey the PCO IE including the low latency PDN session indication to UE 110. At 412, mobility element 104 acknowledges the Update Bearer Request procedure by sending an Update Bearer Response message to CP element 106.

Upon receiving the PCO IE with the indication to create the low latency PDN session, UE 110 initiates, at 414, the low latency PDN session creation using a Create PDN Request message that UE 110 communicates to mobility element 104. The Create PDN Request message sent from UE 110 includes PCO IE 200 carrying the indication to create a PDN session for low latency traffic (e.g., {0018H})

for UE 110 and the request ID as was received in the Update Bearer Request at 410. At 416, mobility element 104 communicates a Create Session Request message that includes the PCO IE to CP element 106. The remaining interactions and operations as illustrated respectively at 418, 419, 420, 422, 424, 426, 428, and 430 are analogous to those discussed in FIG. 3 corresponding to 324, 325, 326, 328, 330, 332, 334, and 336, respectively.

Thus, as illustrated for the embodiment of FIG. 4, techniques that provide for low latency traffic segregation to ensure the edge user plane is not overloaded may be implemented via mobile network 100 when UE 110 is triggered to create a low latency PDN session from within mobile network 100.

Figure 5:
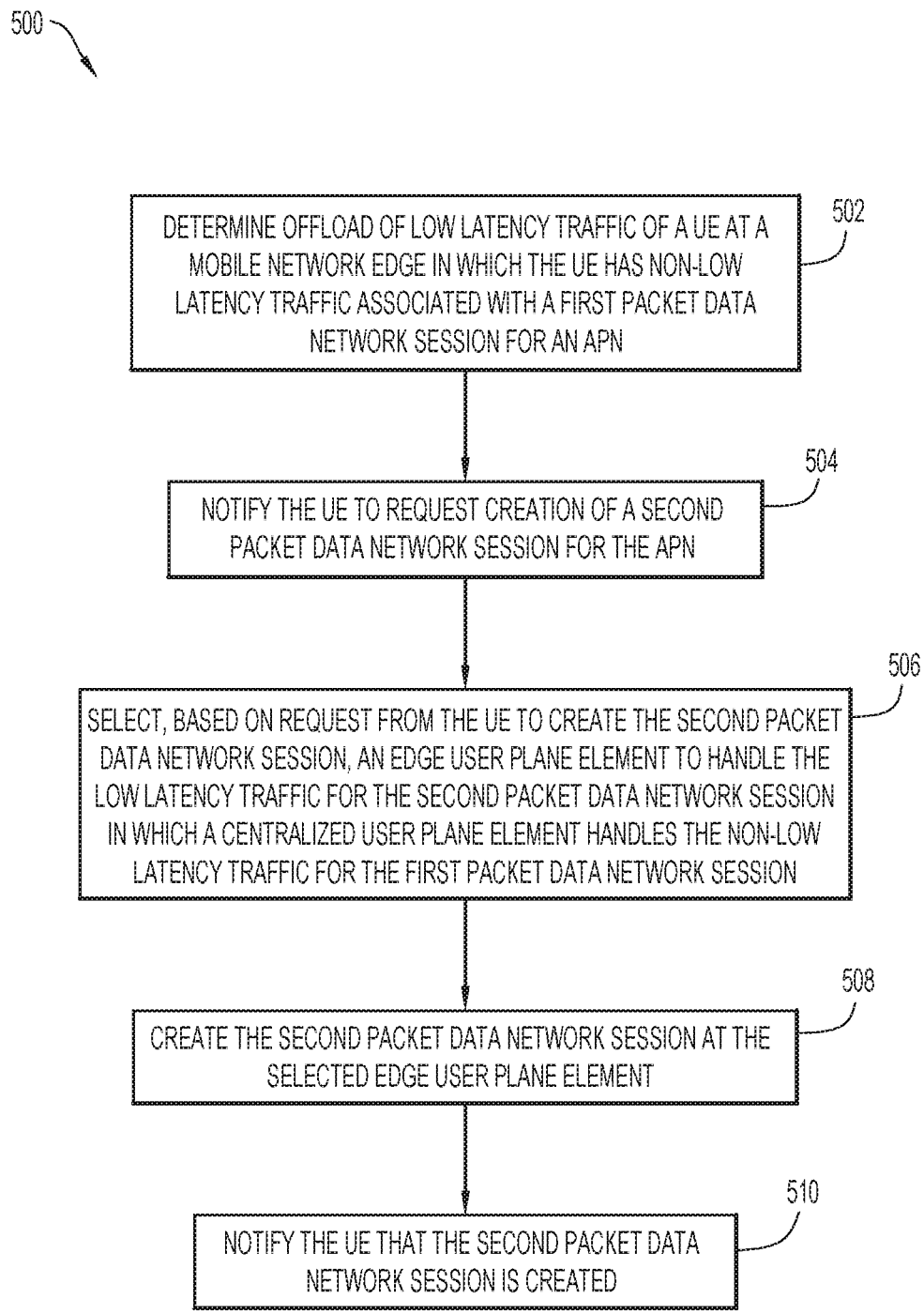
FIG. 5 is a simplified flow chart illustrating example operations associated with providing low latency traffic segregation, according to an example embodiment.

Referring to FIG. 5, FIG. 5 is a simplified flow chart illustrating example operations 500 associated with providing low latency traffic segregation, according to an example embodiment.

At 502, the operations include determining, by a CP element (e.g., CP element 106 such as a PGW-C, SAEGW-C, or SMF) offload of low latency traffic for a UE (e.g., UE 110) at a mobile network edge in which the UE has non-low latency traffic associated with a first (e.g., non-low latency) PDN session for an APN. In some embodiments, the determination at 502 may be based on receiving an indication from the UE that the UE supports low latency traffic segregation for offload of the low latency traffic at the mobile network edge. In such embodiments, the indication from the UE may be included as a PCO IE carried in a Create PDN Session request message received from the UE.

In still some embodiments, the determination at 502 may be triggered based on notification from a policy element (e.g., policy element 108 such as a PCRF or PCF) due to a change in network operator policy, change in UE subscription, UE movement, etc.

[moo] At 504, the operations include the CP element notifying the UE to request creation of a second (e.g., low latency) PDN session for the APN. In at least one embodiment, the notification to the UE can be made via messaging that includes a PCO IE carrying a private extension indicator that indicates to the UE that it is to initiate creation of the second PDN session (e.g., network to MS private extension {0017H}) and a request ID. The PCO IE may be carried in a Create Session Response message or in an Update Bearer Request message, as discussed for embodiments herein.

At 506, the operations include the CP element, based on receiving a request from the UE to create the second PDN session, selecting an edge UP element at the mobile network edge (e.g., edge UP element 132 at mobile network edge 130) to route/handle low latency traffic for the second PDN session in which a centralized UP element (e.g., centralized UP element 102) routes/handles the non-low latency traffic for the first PDN session. In at least one embodiment, the UE request can be received via messaging that includes a PCO IE carrying a private extension indicator that indicates that the request is associated with creating a low latency PDN session for the UE (e.g., MS to network private extension {0018H}) and the request ID. In at least one embodiment, the edge UP element is selected based on proximity to the UE, in that the edge UP element is closer to the UE than the edge UP element that routes the non-low latency traffic for the non-low latency PDN session. In various embodiments, different location information for the UE and location information for UP elements in the network may be correlated in order to select an edge UP element that is closer to the UE than the centralized UP element handling the non-low latency traffic for the UE.

At 508, the operations include the CP element creating the second PDN session for the UE for the low latency traffic at the selected edge UP element. In at least one embodiment, the operations at 508 may include activating PCC rules for the UE at the selected edge UP element in which the PCC rules are associated with the low latency traffic for the UE.

At 510, the operations include the CP element notifying the UE that the second PDN session is created and is a low latency PDN session. In at least one embodiment, the notification at 510 includes a PCO IE that indicates to the UE that the second PDN session is a low latency PDN (e.g., network to MS private extension {0018H}). In at least one embodiment, the notification at 510 includes one or more Traffic Packet Filters that the UE can use to determine which traffic the UE is to transmit via the second, low latency PDN session and which packets to transmit via the first, non-low latency PDN.

Figure 6:
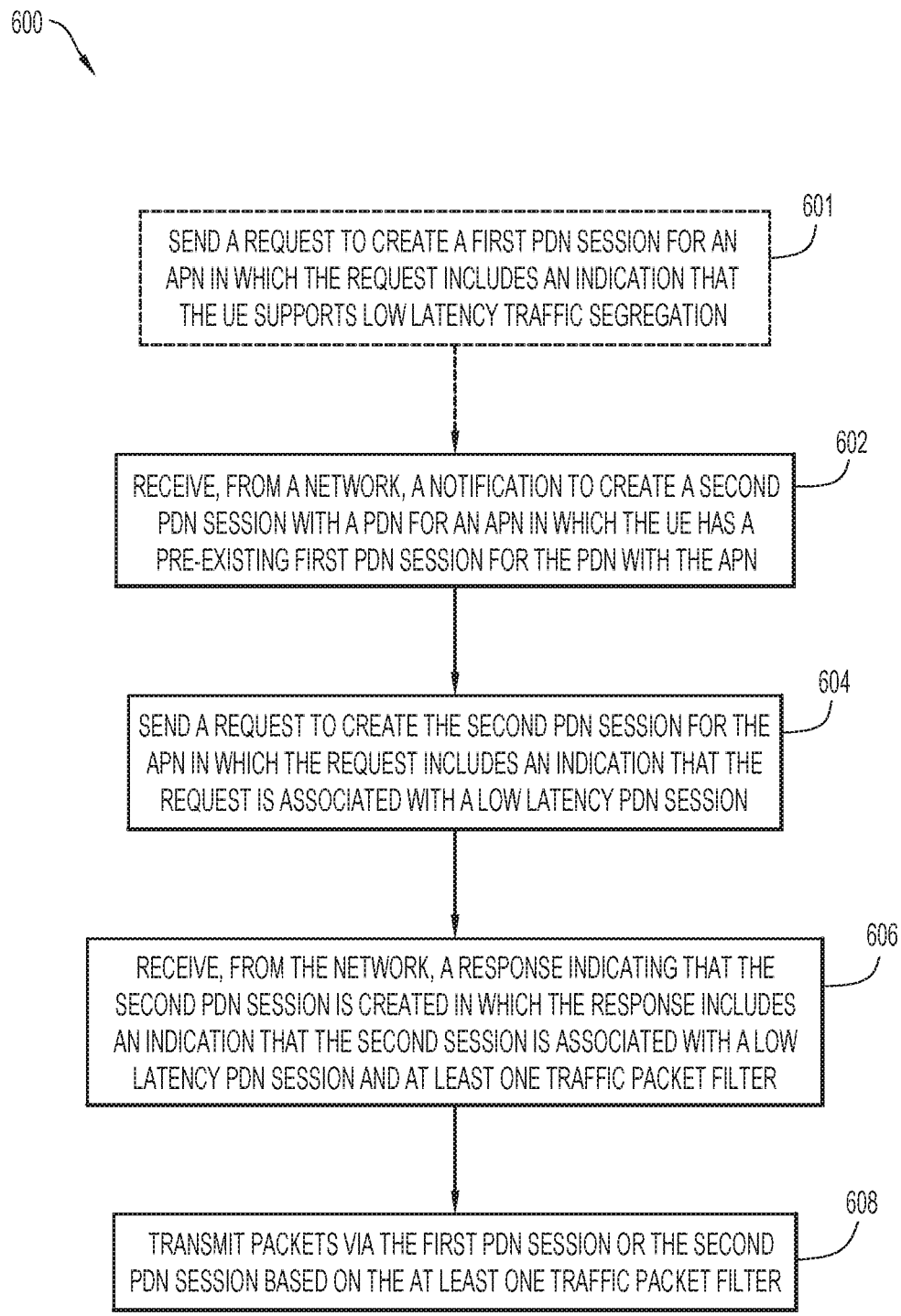
FIG. 6 is a simplified flow chart illustrating example user equipment (UE) operations associated with low latency traffic segregation, according to an example embodiment.

Referring to FIG. 6, FIG. 6 is a simplified flow chart illustrating example UE operations 600 associated with low latency traffic segregation, according to an example embodiment. In at least one embodiment, operations 600 may be performed by UE 110.

At 602, the operations include the UE receiving from a network (e.g., from CP element 106 within mobile network 100) a notification to create a second (e.g., low latency) PDN session with a PDN for an APN in which the UE has a pre-existing first PDN session with the PDN for the APN. In at least one embodiment, the notification may be included in a Create Session Response message within a PCO IE carrying a request ID and a private extension indicator that indicates that the UE is to initiate the second PDN session creation (e.g., network to MS private extension {0017H}). For example, in some embodiments, as shown at 601, the UE may send the network a request to create a first PDN session for the APN in which the request includes an indication that the UE supports low latency traffic segregation (e.g., MS to network private extension {0017H}). In such an embodiment, the notification received at 602 may be a Create Session Response to the UE request (601) that includes the notification from the network to create the second PDN session and a request ID.

In another embodiment, however, the notification received at 602 may be initiated by the network in which the UE receives an Update Bearer Request message in which the notification is included within a PCO IE carrying a private extension indicator that indicates that the UE is to initiate the second PDN session creation (e.g., network to MS private extension {0017H}) and a request ID. Thus, there may be different mechanisms through which a UE receives a notification to create the second PDN session.

At 604, based on receiving the notification, the operations include the UE sending a request to the network (e.g., to the CP element) to create the second PDN session for the APN in which the request includes an indication that the request is associated with a low latency PDN session. In at least one embodiment, the request may be sent by communicating a Create PDN Session Request message to the network indicating that the request is for a low latency PDN session and including the request ID as received at 602. In at least one embodiment, the indication may be included within a PCO IE carrying a private extension indicator that indicates that the request is associated with creating a low latency PDN session for the UE (e.g., MS to network private extension {0018H}).

At 606, the operations include the UE receiving a response from the network indicating that the second PDN session is created in which the response includes an indication that the created second PDN session is associated with a low latency PDN session and the response further includes at least one Traffic Packet Filter. In at least one embodiment, the response received by the UE may be a Create Session Response message in which the indication may be included within a PCO IE carrying a private extension indicator that indicates that the created second PDN session is associated with a low latency PDN session (e.g., network to MS private extension {0018H}).

At 608, the operations include the UE transmitting packets via the first, low latency PDN session or the second, non-low latency PDN session based on the at least one Traffic Packet Filter.

Figure 7:
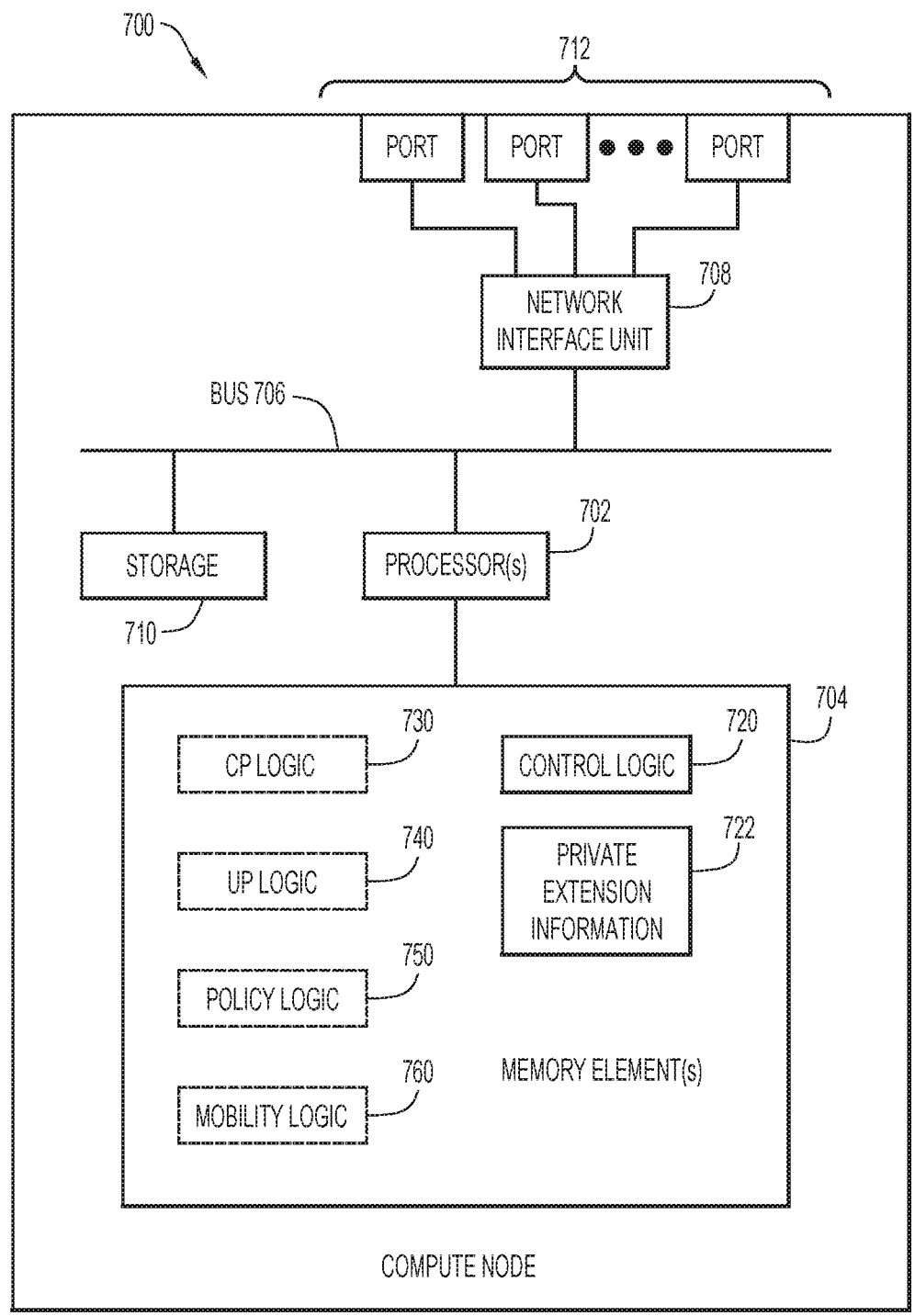
FIG. 7 is a simplified block diagram illustrating example details associated with a compute node for implementing operations described herein, according to an example embodiment.

Referring to FIG. 7, FIG. 7 is a simplified block diagram illustrating example details associated with a compute node 700 for implementing operations described herein, according to an example embodiment. The embodiment of FIG. 7 illustrates compute node 700, which includes one or more processor(s) 702, one or more memory element(s) 704, a bus 706, a network interface unit 708, and storage 710. Memory element(s) 704 may include instructions for control logic 720 and may also include private extension information 722. In various embodiments, compute node 700 may also include CP logic 730, UP logic 740, policy logic 750, and/or mobility logic 760.

In various embodiments, compute node 700 can be implemented: as a data center compute node such as a server, rack of servers, multiple racks of servers, etc. for a data center; as a cloud compute node, which can be distributed across one or more data centers; as combinations thereof or the like. In various embodiments, one or more compute node(s) 700 can be used to realize elements of mobile network 100. In various embodiments, processor(s) 702, memory element(s) 704, bus 706, network interface unit 708, storage 710 and logic, software, etc. configured for compute node 700 can represent hardware, software, and network resources, which can be abstracted into a 4G CUPS implementation and/or 5G implementation for mobile network 100 comprising any number or instances of mobility elements 104, UP elements (e.g., centralized UP elements 102 and edge UP elements 132), CP elements 106, and policy elements 108 for various architecture implementations.

In at least one embodiment, processor(s) 702 is/are at least one hardware processor configured to execute various tasks, operations, and/or functions for compute node 700 as described herein according to software and/or instructions configured for compute node 700. In at least one embodiment, memory element(s) 704 is/are configured to store data, information, software and/or instructions associated with compute node 700 and logic configured for memory element(s) 704. In at least one embodiment, bus 706 can be configured as an interface that enables one or more elements of compute node 700 (e.g., network interface unit 708, processor(s) 702, memory element(s) 704 (and logic configured therein), etc. to communicate in order to exchange information and/or data. In at least one embodiment, a fast kernel-hosted interconnect may be employed for compute node 700, potentially using shared memory between processes (e.g., VNFs, etc.), which can enable efficient communication paths between the processes. In various embodiments, network interface unit 708 enables communication between compute node 700 and other compute nodes, via one or more ports 712 at which traffic is received and transmitted to facilitate operations discussed for various embodiments described herein. In some embodiments, network interface unit 708 can be configured with one or more Ethernet driver(s) and/or controller(s) or other similar network interface driver(s) and/or controller(s) to enable communications for compute node 700 within mobile network 100. Compute node 700 can include any suitable interfaces for receiving, transmitting, and/or otherwise communicating data or information in a network environment.

In various embodiments, storage 710 can be configured to store data, information and/or instructions associated with compute node 700 and/or logic configured for memory element(s) 704. For example, for embodiments in which an instance of a UP element is implemented, storage 710 can be configured to store PCC rules for subscriber sessions or the like. In another example, for embodiments in which an instance of a CP element is implemented, storage 710 can also be configured to PCC rules for subscriber sessions or the like. Note that in certain examples, storage 710 can be consolidated with memory elements 704 (or vice versa), and/or the storage/memory elements can overlap/exist in any other suitable manner.

In various embodiments, private extension information 722 may include any information, data, data structures, or the like for any PCO IE indications, AVPs, or the like discussed that may facilitate various operations as discussed herein.

In at least one embodiment, control logic 720 can include instructions that, when executed (e.g., by processor(s) 702), cause compute node 700 to perform operations, which can include, but not be limited to providing control operations for compute node 700, cooperating and/or interacting with other logic; maintaining and/or interacting with stored data, information, parameters (e.g., memory element(s), storage, data structures, databases, tables, etc.); combinations thereof; and/or the like to facilitate any operations as discussed for various embodiments described herein.

In at least one embodiment, CP logic 730 can include instructions that, when executed (e.g., by processor(s) 702) cause compute node 700 to perform operations for a CP element, which can include, but not be limited to, performing session creation processes/exchanges with one or more UE, performing session creation processes/exchanges with one or more UP elements, performing validation and other exchanges with policy elements, selecting edge UP elements, combinations thereof, and/or the like as discussed for any operations and/or interactions as described herein.

In at least one embodiment, UP logic 740 can include instructions that, when executed (e.g., by processor(s) 702) cause compute node 700 to perform operations for a UP element, which can include, but not be limited to, performing session creation processes/exchanges with one or more CP elements, activating PCC rules for UE PDN sessions, routing traffic for UE PDN sessions between a UE and a PDN, combination thereof, and/or the like as discussed for any operations and/or interactions as described herein.

In at least one embodiment, policy logic 750 can include instructions that, when executed, cause compute node 700 to perform operations for a policy element, which can include, but not be limited to, performing validation and other exchanges with CP elements, providing PCC rules for one or more UE PDN sessions including PCC rules associated with low latency PDN sessions and PCC rules associated with non-low latency PDN sessions, combinations thereof, and/or the like to facilitate any operations as discussed for various embodiments described herein.

In at least one embodiment, mobility logic 760 can include instructions that, when executed, cause compute node 700 to perform operations for a mobility element, which can include, but not be limited to, performing session creation processes/exchanges with one or more CP elements and/or one or more UE, performing bearer update processes/ exchanges with one or more CP elements and/or one or more UE, combinations thereof, and/or the like to facilitate any operations as discussed for various embodiments described herein.

In various embodiments, memory element(s) 704 may include any suitable memory element such as random access memory (RAM), dynamic RAM (DRAM), static RAM (SRAM), and cache memory. In general, memory element(s) 704 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 710 may include any suitable storage such as persistent storage, which may be a magnetic disk drive, a solid state hard drive, a semiconductor storage device, read only memory (ROM), an erasable programmable read only memory (EPROM), flash memory, or any other computer readable storage media, which may be inclusive of non-transitory tangible media and/or non-transitory computer readable storage media, that is capable of storing program/logic/software instructions and/or digital information. In some embodiments, the media used by storage 710 may also be removable. For example, a removable hard drive may be used for storage 710. Other examples include optical and magnetic disks, thumb drives, and smart cards that are inserted into a drive for transfer onto another computer readable storage medium that is also part of storage 710.

Figure 8:
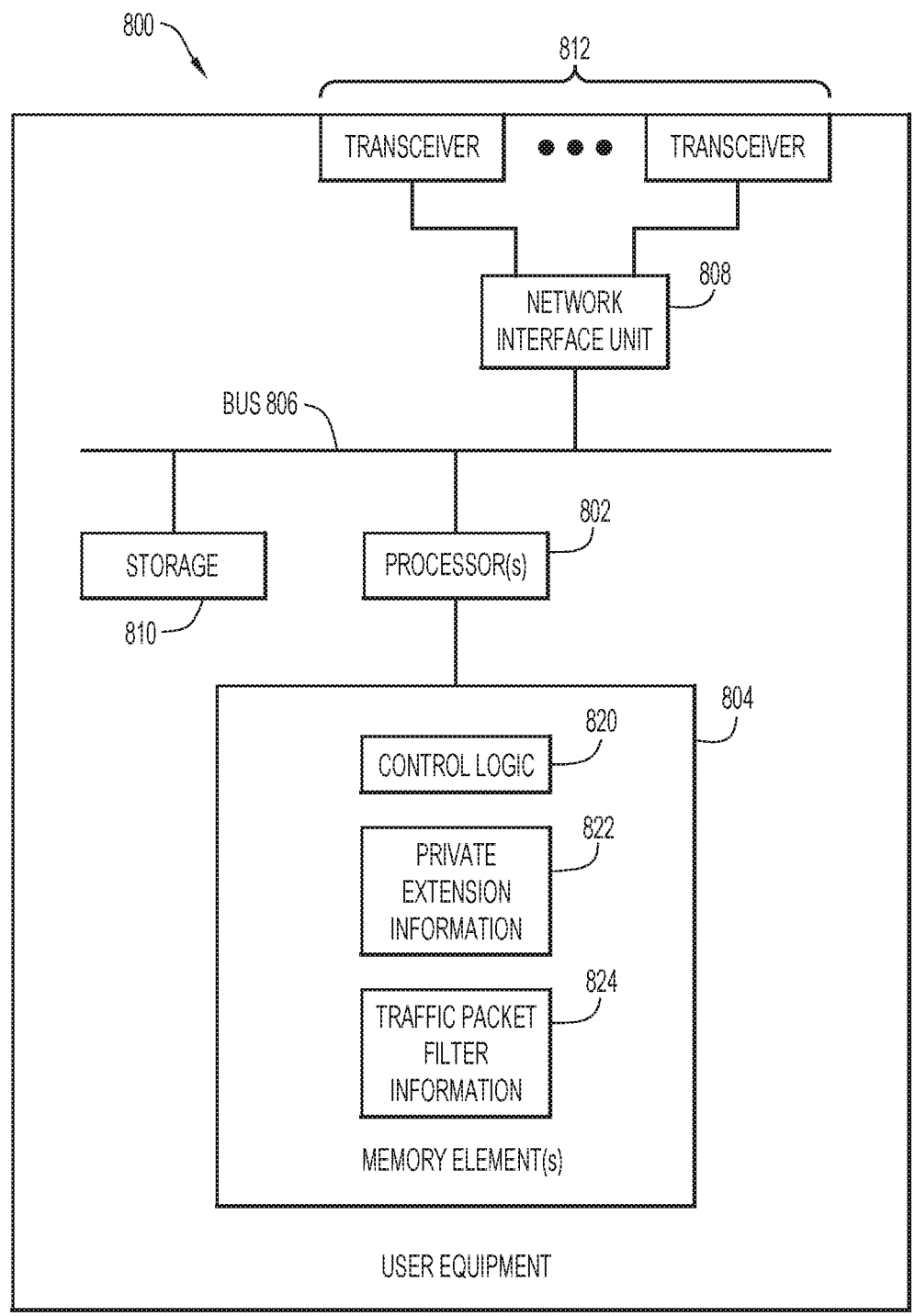
FIG. 8 is a simplified block diagram illustrating example details associated with a user equipment for implementing operations described herein, according to an example embodiment.

Referring to FIG. 8, FIG. 8 is a simplified block diagram illustrating example details associated with a UE 800 for implementing operations described herein, according to an example embodiment. The embodiment of FIG. 8 illustrates UE 800, which includes one or more processor(s) 802, one or more memory element(s) 804, a bus 806, a network interface unit 808, and storage 810. Memory element(s) 804 may include instructions for control logic 820, private extension information 822, and traffic packet filter information 824.

In various embodiments, UE 800 may be any UE described herein (e.g., UE 110), which may be capable of performing over-the-air RF communications for 4G and/or 5G RANs (e.g., RAN 120). In some embodiments, UE 800 may also be capable of performing over-the-air communications for other communications standards such as 3GPP 3G RANs, Institute of Electrical and Electronics Engineers (IEEE) Standard 802.11™-2012, published Mar. 29, 2012 (e.g., WiFi), WiMax, IEEE Standard 802.16™-2012, published Aug. 17, 2012, Radio-frequency Identification (RFID), Near Field Communication (NFC), Bluetooth™, etc.

In at least one embodiment, processor(s) 802 is/are at least one hardware processor configured to execute various tasks, operations, and/or functions for UE 800 as described herein according to software and/or instructions configured for UE 800. In at least one embodiment, memory element(s) 804 is/are configured to store data, information, software and/or instructions associated with UE 800 and logic configured for memory element(s) 804. In at least one embodiment, bus 806 can be configured as an interface that enables one or more elements of UE 800 (e.g., network interface unit 808, processor(s) 802, memory element(s) 804 (and logic configured therein), etc. to communicate in order to exchange information and/or data. In at least one embodiment, a fast kernel-hosted interconnect may be employed for UE 800, potentially using shared memory between processes, which can enable efficient communication paths between the processes. In various embodiments, network interface unit 808 enables communication between UE 800 and other network elements (e.g., RAN element 124), via one or more transceivers 812 (e.g., receive and transmit units) at which traffic is received and transmitted to facilitate operations discussed for various embodiments described herein. In some embodiments, network interface unit 808 can be configured with one or more radio access network interface driver(s) and/or controller(s) to enable communications for UE 800 within mobile network 100. UE 800 can include any suitable interfaces for receiving, transmitting, and/or otherwise communicating data or information in a network environment.

In various embodiments, storage 810 can be configured to store data, information and/or instructions associated with UE 800 and/or logic configured for memory element(s) 804. Note that in certain examples, storage 810 can be consolidated with memory elements 804 (or vice versa), and/or the storage/memory elements can overlap/exist in any other suitable manner.

In various embodiments, private extension information 822 may include any information, data, data structures, or the like for any PCO IE indications or the like to facilitate various operations as discussed herein. In various embodiments, traffic packet filter information 824 may include any information, data, data structures, or the like for any Traffic Packet Filters (e.g., 5-tuple information (e.g., source IP address/port, destination IP address/port, ranges of such information), etc.) that may be received and/or preconfigured for UE 800 to facilitate transmitting packets for IP flows via an appropriate PDN session for an APN (e.g., latency sensitive PDN session 133 or non-latency sensitive PDN session 103).

In at least one embodiment, control logic 820 can include instructions that, when executed (e.g., by processor(s) 802), cause UE 800 to perform operations, which can include, but not be limited to providing control operations for UE 800; cooperating and/or interacting with other logic; maintaining and/or interacting with stored data, information, parameters (e.g., memory element(s), storage, data structures, databases, tables, etc.); performing session creation and/or update processes/exchanges with one or more CP elements and/or mobility elements; performing bearer update processes/exchanges with one or more mobility elements and/or one or more CP elements; applying traffic packet filters for transmitting packets to a mobile network (e.g., for uplink transmissions); combinations thereof; and/or the like to facilitate any operations as discussed for various embodiments described herein.

In various embodiments, memory element(s) 804 may include any suitable memory element such as random access memory (RAM), dynamic RAM (DRAM), static RAM (SRAM), and cache memory. In general, memory element(s) 804 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 810 may include any suitable storage such as persistent storage, which may be a magnetic disk drive, a solid state hard drive, a semiconductor storage device, read only memory (ROM), an erasable programmable read only memory (EPROM), flash memory, or any other computer readable storage media, which may be inclusive of non-transitory tangible media and/or non-transitory computer readable storage media, that is capable of storing program/logic/software instructions and/or digital information. In some embodiments, the media used by storage 810 may also be removable. For example, a removable hard drive may be used for storage 810. Other examples include optical and magnetic disks, thumb drives, and smart cards that are inserted into a drive for transfer onto another computer readable storage medium that is also part of storage 810.

In summary, as illustrated by the embodiments of FIGS. 1-8, the solution and techniques as discussed herein provide flexible and dynamic techniques to implement low latency traffic segregation in a mobile network to ensure the edge UP is not overloaded. In at least one embodiment, techniques discussed herein can be implemented as part of Cisco® Ultra Packet Core CUPS solution. The Cisco® Ultra CUPS solution supports the concept of UP groups, which is merely a group of UPs. These UP groups can be then associated with APNs. This allows CUPS CP to select UPs from a centralized UP pool. Ultra CUPS also supports dynamic UP selection based on location of the subscriber, this can be used to select a UP at the edge for anchoring low latency traffic at the edge.

As mentioned previously, an operator can use this techniques as described herein to provide the following without having the need to have a separate APN for the low latency traffic:

1) Be able to segregate traffic within the same APN so that the resources at edge meant for low latency traffic handling are used only for the low latency traffic handling.

2) Tie up (e.g., partner) with content providers like Netflix, Hulu, or others to provide low latency User experiences to subscribers who subscribe for such services.

3) Support latency sensitive applications like electronic health applications, industrial robotics, and others.

In at least one embodiment for a 5G Standalone (SA) core architecture, techniques described herein can be extended by allowing SMF to have multiple protocol data units (PDUs), with one designated as a low latency traffic PDU and the other PDU for the rest. For a low latency PDU, the SMF selects the UPF at the edge while for the rest of the traffic PDU a centralized UPF is selected to anchor the PDUs.

In various embodiments, benefits of the solution discussed herein may include, but not be limited to: providing for the ability to manage traffic segregation using the same APN by using two PDN sessions; allowing network operators the ability to make sure that only traffic that really needs low latency is handled by UP at the mobile network edge, while the rest goes to the centralized UP; removing the need for a separate APN for low latency traffic; providing dynamic control based on UE support, CP element (e.g., PGW-C, SAEGW-C, and/or SMF) support, and policy element (e.g., PCRF and/or PCF) support; and/or providing for control by network operators using operator policies and/or subscription policies.

Accordingly, provided herein is a solution and techniques, which allows network operators to have ability to segregate low latency traffic within a low latency PDN session connection from the rest of the non-latency sensitive traffic, so that only the genuine low latency traffic is processed on the edge user plane; whereas the rest of the non-latency sensitive traffic goes to the user plane that is centralized. Thus, the solutions provided herein help in segregating the traffic for the same APN and ensure that only the low latency sensitive traffic is handled by the UP at the edge.

The operations described herein may be identified based upon the application for which they are implemented in a specific embodiment. However, it should be appreciated that any particular operation nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer, compute node, or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Note that in certain example implementations, operations as outlined herein may be implemented by logic encoded in one or more tangible media, which may be inclusive of non-transitory tangible media and/or non-transitory computer readable storage media (e.g., embedded logic provided in an application specific integrated circuit (ASIC), in digital signal processing (DSP) instructions, software [potentially inclusive of object code and source code] to be executed by a processor, or other similar machine, etc.). In some of these instances, a memory element or storage can store data used for operations described herein. This includes memory elements or storage being able to store software, logic, code, and/or processor instructions that are executed to carry out operations described herein. A processor (e.g., a hardware processor) can execute any type of instructions associated with data to achieve the operations detailed herein. In one example, a processor may transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and the elements identified herein could be some type of a programmable processor, programmable digital logic (e.g., a field programmable gate array (FPGA), a DSP processor, an EPROM, a controller, an electrically erasable PROM (EEPROM), or an ASIC that includes digital logic, software, code, electronic instructions, or any suitable combination thereof.

In one example implementation, a compute node can encompass network appliances, routers, servers, switches, gateways, bridges, load balancers, firewalls, processors, modules, or any other suitable device, component, element, or object operable to exchange information that facilitates or otherwise helps to facilitate various operations as described for various embodiments discussed herein in a network environment (e.g., for mobile networks such as those illustrated in FIG. 1).

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

Elements and/or systems discussed for various embodiments described herein can couple to one another through simple interfaces (as illustrated) and/or through any other suitable connection (wired or wireless), which provides a viable pathway for network communications. As referred to herein, a physical (wired or wireless) interconnection or interface can refer to an interconnection of one element with one or more other element(s), while a logical interconnection or interface can refer to communications, interactions and/or operations of elements with each other, which can be directly or indirectly interconnected, in a network environment. Additionally, any one or more of the elements and/or systems may be combined or removed from a given deployment based on a particular configuration and/or implementation.

In various embodiments, mobile network 100 may implement user datagram protocol/Internet Protocol (UDP/IP) connections and/or transmission control protocol/IP (TCP/IP) communication language protocol in particular embodiments of the present disclosure. However, mobile network 100 can alternatively implement any other suitable communication protocol, interface and/or standard, proprietary and/or non-proprietary, for transmitting and receiving messaging and/or signaling. Other protocols, interfaces and/or communication standards that can be used in mobile network 100 can include 3GPP Diameter-based protocols, Remote Authentication Dial-In User Service (RADIUS) protocols, Authentication, Authorization and Accounting (AAA) signaling, a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), Simple Object Access Protocol (SOAP), SOAP over Hypertext Transfer Protocol (HTTP), Representational State Transfer (REST), combinations thereof or the like. In some embodiments, secure communications can be facilitated using TCP/IP Secure Sockets Layer (SSL) communications.

In various embodiments, mobile network 100 can represent a series of points or elements of interconnected communication paths (wired or wireless) for receiving and transmitting packets of information that propagate through mobile network 100. In various embodiments, mobile network 100 can be associated with and/or provided by a single network operator or service provider and/or multiple network operators or service providers. In various embodiments, mobile network 100 can include and/or overlap with, in whole or in part, one or more packet data network(s). Mobile network 100 may offer communicative interfaces between various elements of mobile network 100 and may be associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment A communication system, such as mobile network 100, through which communications propagate in can use any suitable technologies for communication including wireless (e.g., 3G/4G/5G/NG network, Institute of Electrical and Electronics Engineers (IEEE) Standard 802.11™-2012, published Mar. 29, 2012 (e.g., WiFi), WiMax, IEEE Standard 802.16™-2012, published Aug. 17, 2012, Radio-frequency Identification (RFID), Near Field Communication (NFC), Bluetooth™, etc.) and/or wired (e.g., T1 lines, T3 lines, digital subscriber lines (DSL), Ethernet, etc.) communication. Generally, any suitable means of communication may be used such as electric, sound, light, infrared, and/or radio.

Note that in this disclosure, references to various features (e.g., elements, structures, nodes, modules, components, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein this Specification, can be inclusive of an executable file comprising instructions that can be understood and processed on a computer, processor, machine, compute node, combinations thereof, or the like and may further include library modules loaded during execution, object files, system files, hardware logic, software logic, and/or any other executable modules.

The embodiments presented may be implemented in various forms, such as a system, a method, and/or a computer program product at any possible technical detail level of integration. The computer program product may include a non-transitory computer readable storage medium (or media) having computer readable program instructions thereon for causing a processor to carry out aspects of operations presented herein.

It is also important to note that the operations and steps described with reference to the preceding figures illustrate only some of the possible scenarios that may be executed by, or within, a communication system (e.g., mobile network 100). Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interactions may be described in terms of one, two, three, or four elements. However, this has been done for purposes of clarity and example only. In certain cases, it may be easier to describe one or more of the functionalities by only referencing a limited number of network elements. It should be appreciated that networks discussed herein (and their teachings) are readily scalable and can accommodate a large number of components, as well as more complicated/sophisticated arrangements and configurations. Accordingly, the examples provided should not limit the scope or inhibit the broad teachings of networks discussed herein as potentially applied to a myriad of other architectures.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain protocols, networks discussed herein may be applicable to other exchanges or routing protocols, interfaces, and/or communications standards, proprietary and/or non-proprietary. Moreover, although networks described herein have been illustrated with reference to particular elements and operations that facilitate processes, these elements, and operations may be replaced by any suitable architecture or process that achieves the intended functionality of networks described herein.

What is claimed is:

1. A method comprising:
    transmitting, by a user equipment (UE) to a mobile network, a request to create a first packet data network session that includes an indication that the UE supports low latency traffic segregation;
    obtaining, from the mobile network by the UE, a notification to create a second packet data network session;
    transmitting, by the UE, a request to create the second packet data network session, wherein the request indicates that the request is for a low latency packet data network session; and
    obtaining, by the UE, a response indicating that the second packet data network session is created, wherein the response includes an indication that the second packet data network session is the low latency packet data network session and wherein the response includes at least one traffic packet filter.

2. The method of claim 1, further comprising:
    transmitting, by the UE, one or more packets via the first packet data network session or the second packet data network session based on the at least one traffic packet filter.

3. The method of claim 1, wherein the response obtained by the UE includes a protocol configuration options information element that indicates that the second packet data network session is the low latency packet data network session.

4. The method of claim 1, wherein the request to create the first packet data network session includes a protocol configuration options information element that indicates that the UE supports low latency traffic segregation.

5. The method of claim 1, wherein the notification obtained by the UE to create the second packet data network session is included in a response to the request to create the first packet data network session.

6. The method of claim 5, wherein the notification to create the second packet data network session is included in a protocol configuration options information element instructing the UE to create the low latency packet data network session.

7. The method of claim 1, wherein the first packet data network session and the second packet data network session are for a same access point name (APN).

8. One or more non-transitory computer readable storage media encoded with instructions that, when executed by a processor, cause the processor to perform operations, comprising:
    transmitting, by a user equipment (UE) to a mobile network, a request to create a first packet data network session that includes an indication that the UE supports low latency traffic segregation;
    obtaining, from the mobile network by the UE, a notification to create a second packet data network session;
    transmitting, by the UE, a request to create the second packet data network session, wherein the request indicates that the request is for a low latency packet data network session; and
    obtaining, by the UE, a response indicating that the second packet data network session is created, wherein the response includes an indication that the second packet data network session is the low latency packet data network session and wherein the response includes at least one traffic packet filter.

9. The media of claim 8, further comprising instructions that, when executed by the processor, cause the processor to perform further operations, comprising:
    transmitting, by the UE, one or more packets via the first packet data network session or the second packet data network session based on the at least one traffic packet filter.

10. The media of claim 8, wherein the response obtained by the UE includes a protocol configuration options information element that indicates that the second packet data network session is the low latency packet data network session.

11. The media of claim 8, wherein the request to create the first packet data network session includes a protocol configuration options information element that indicates that the UE supports low latency traffic segregation.

12. The media of claim 8, wherein the notification obtained by the UE to create the second packet data network session is included in a response to the request to create the first packet data network session.

13. The media of claim 8, wherein the first packet data network session and the second packet data network session are for a same access point name (APN).

14. A user equipment (UE) comprising:
at least one memory element for storing data; and
at least one processor for executing instructions associated with the data, wherein executing the instructions causes the UE to perform operations, comprising:
transmitting, by the UE to a mobile network, a request to create a first packet data network session that includes an indication that the UE supports low latency traffic segregation;
obtaining, from the mobile network by the UE, a notification to create a second packet data network session;
transmitting, by the UE, a request to create the second packet data network session, wherein the request indicates that the request is for a low latency packet data network session; and
obtaining, by the UE, a response indicating that the second packet data network session is created, wherein the response includes an indication that the second packet data network session is the low latency packet data network session and wherein the response includes at least one traffic packet filter.

15. The UE of claim 14, wherein executing the instructions causes the UE perform further operations, comprising:
transmitting, by the UE, one or more packets via the first packet data network session or the second packet data network session based on the at least one traffic packet filter.

16. The UE of claim 14, wherein the response obtained by the UE includes a protocol configuration options information element that indicates that the second packet data network session is the low latency packet data network session.

17. The UE of claim 14, wherein the request to create the first packet data network session includes a protocol configuration options information element that indicates that the UE supports low latency traffic segregation.

18. The UE of claim 14, wherein the notification obtained by the UE to create the second packet data network session is included in a response to the request to create the first packet data network session.

19. The UE of claim 18, wherein the notification obtained by the UE is included in a protocol configuration options information element instructing the UE to create the low latency packet data network session.

20. The UE of claim 14, wherein the first packet data network session and the second packet data network session are for a same access point name (APN).

* * * * *